3,246,013
PREPARATION OF CRYSTALLINE WARFARIN SODIUM-ISOPROPYL ALCOHOL COMPLEX

Nathan Weiner, Rego Park, and Moe Johnson, Woodhaven, N.Y., and Collin H. Schroeder and Karl Paul Link, Madison, Wis., assignors to Wisconsin Alumni Research Foundation, Madison, Wis., a corporation of Wisconsin
No Drawing. Filed Feb. 15, 1963, Ser. No. 258,910
11 Claims. (Cl. 260—343.2)

The present invention relates to warfarin known chemically as 3-($\alpha$-acetonylbenzyl)-4-hydroxycoumarin and more specifically to an improved process of preparing the crystalline warfarin sodium·isopropyl alcohol complex.

The use of the sodium derivative of the widely used rodenticide warfarin (see Link, K. P., and Ross, Ward, Pest Control, August 1956) as an anticoagulant in the clinical field is now well-known. See the New York Heart Association (New York Academy of Medicine) lecture entitled, "The Discovery of Dicumarol and Its Sequels," of February 25, 1958, by Karl Paul Link, Circulation, 19, No. 1, pages 97–107 (1959). See also Pollock, B. E., J.A.M.A. 161, 404 (1956), and Shapiro et al., J.A.M.A. 165, 1377 (1957). Indeed, warfarin sodium has been called the "more nearly ideal anticoagulant drug now available," Nicholson, J. H., New England J. of Medicine, 255, 491 (1956). See also Baer, S., J.A.M.A. 167, 704, June 1958; editorial, "Anticoagulants—a Cooperative Effort," J.A.M.A. 169, 172/1484 (March 28, 1959); Mouquin, M., et. al., "Le Traitement Anticoagulant par la Warfarine Sodique en Cardiologie," La Presse Médicale, 68, 1079–1082 (1960), and Nora, J. J., "Long-Term Outpatient Anticoagulant Therapy, J.A.M.A., 174:2, Sept. 10 (1960); also M. Times 89, 502 (1961).

In early research investigations in this field it was noted that warfarin sodium when in aqueous solution had a slight yellow color or took on a yellow color on standing which was followed by the formation of precipitates. Ampules containing off-color solutions with precipitates were unacceptable for intravenous use. It is important that warfarin medicaments used in the clinical field should be free or substantially free from non-warfarin products. This is particularly true where, as here, the nature of the products was not completely determined. The desirability of eliminating so far as possible all objectionable material and especially unknown impurities of undetermined activity in warfarin sodium for medicinal use with human beings is enhanced by the rapidly increasing prophylactic use of this drug on a long term basis. See Hiram H. Belding, M.D., "Prophylactic Use of Anticoagulants in Postoperative Patients," Western Journal of Surgery, Obstetrics and Gynecology 68: 84–89, March-April 1960; see also Allen, E. V., Barker, N. W., and Hines, E. A., "Peripheral Vascular Diseases," W. B. Saunders, Philadelphia, 3rd edition, 1962, Chapter XXIX. During these investigations it was found that the color developed is due in a small measure to warfarin sodium but in a large measure to by-products including phenolic products, one of which has been isolated and identified as 3-(o-hydroxyphenyl)-5-phenyl-2-cyclohexene-1-one from warfarin sodium preparations. These undesirable color-producing compounds can be materially reduced by treating an aqueous solution of warfarin sodium prepared with excess warfarin with activated charcoal as described in Link U.S. Patent 2,777,859.

The warfarin sodium preparations described above have been used successfully in the clinic but the search has continued to make the preparations as pure as possible, i.e. to lower the Alkaline Color Value. This value is determined by dissolving 1.25 g. of warfarin sodium in 10 ml. of 5% aqueous NaOH and within 15 minutes measuring the optical density in a one cm. cuvette at 385 m$\mu$ using 5% aqueous NaOH as the blank. The optical density should not exceed 0.1 which is equivalent to 38 p.p.m. of the indicated substituted cyclohexene-one derivative. A preparation with the lowest possible Alkaline Color Value is desired, as the amount of non-warfarin material responsible for color change and the formation of precipitates, decreases as the Color Value decreases.

Continued efforts to realize a more practical procedure for the production of high purity warfarin sodium involving various solvents and combinations of solvents led to an unexpected and unique property of warfarin sodium. Solvents in which amorphous warfarin sodium is soluble, including methanol, ethanol, n-propyl alcohol, n-butyl alcohol, t-butyl alcohol, ethyl acetate, acetone and N,N-dimethyformamide, did not yield a crystalline product. The preparations in all cases, after removal of the solvent, were obtained in amorphous form with the original impurities which contribute to high Alkaline Color Values. However, it was discovered when warfarin sodium is in solution in isopropyl alcohol, e.g. A.R. isopropyl alcohol ($C_3H_7OH$, B.P. 82.4° C.), the warfarin sodium combines with the isopropyl alcohol to form a warfarin sodium·isopropyl alcohol complex which is crystalline and which can be readily separated from the non-warfarin impurities that remain in solution in the isopropyl alcohol.

The crystalline warfarin sodium·isopropyl alcohol complex contains about 5.7 percent by weight of isopropyl alcohol. The composition of the crystalline warfarin sodium·isopropyl alcohol complex is not changed by repeated washing with ethyl ether or methylene dichloride, solvents in which free isopropyl alcohol is readily soluble. Also, although isopropyl alcohol boils at 82.4° C. at 760 mm. pressure, heating of the crystalline complex at 100° C. for 3–5 hours over $P_2O_5$ at 0.5 mm. pressure does not remove the isopropyl alcohol. The infra-red spectrum of the warfarin sodium·isopropyl alcohol complex also shows $$\lambda_{KBr}^{max} \text{ at } 2.83, 3.40, 8.83, 10.50 \text{ and } 14.46\mu$$

These peaks are not shown by amorphous warfarin sodium and are attributed to the isopropyl alcohol in the crystal lattice of the warfarin sodium·isopropyl alcohol complex.

The crystalline warfarin sodium·isopropyl alcohol complex can be prepared by reacting warfarin sodium with excess isopropyl alcohol at a temperature of about 50–70° C. See copending Schroeder and Link U.S. application Serial No. 90,645, filed February 21, 1961, now Patent No. 3,077,481. In this process the warfarin sodium is first prepared by a multiple-step process involving (1) reacting an aqueous slurry of warfarin containing an excess of warfarin with an aqueous solution of sodium hydroxide, (2) warming the resulting reaction mixture, followed by removal of the excess warfarin by filtration, (3) treating the resulting warfarin sodium solution with activated carbon, (4) removing the carbon, and concentrating the resulting clear solution under reduced pressure at 80° C. to a light to medium syrup, (5) continuing concentrating the light to medium syrup under reduced pressure at 50° C. to a heavy syrup, (6) adding absolute ethanol to the heavy syrup and continuing the removal of water under reduced pressure at 50° C. until the dry product, amorphous warfarin sodium, is obtained. This process of preparing warfarin sodium is described in U.S. Patent No. 2,777,859, supra. A similar process in which isopropyl alcohol is added to the syrups, including the heavy syrup in place of ethanol, is described in the copending Schroeder and Link application, supra. In this process, additional portions of isopropyl alcohol are added to the concentrated heavy syrup and the product is recovered as the warfarin sodium·isopropyl alcohol complex.

In the search for improvements in the above processes involving the reaction of previously prepared warfarin with isopropyl alcohol, and specifically for possible means of eliminating some of the steps, various modifications and combinations were investigated. These investigations for the most part demonstrated that the multiple step warfarin sodium process was essential for obtaining warfarin sodium with the desired low Alkaline Color Value. In continued investigations it was then discovered that the warfarin sodium·isopropyl alcohol complex could be obtained directly from warfarin by forming the warfarin sodium in situ in isopropyl alcohol.

The improved process of the present invention consists essentially of neutralizing warfarin in isopropyl alcohol with a compound represented by the formula RONa, where R is selected from the group consisting of hydrogen and alkyl groups such as methyl, ethyl, n-propyl, isopropyl, n-butyl, isobutyl, sec-butyl and tertiary butyl groups, i.e. lower alkyl groups containing 1–4 carbon atoms. The process is carried out by mixing or suspending warfarin in excess isopropyl alcohol and slowly adding with rapid stirring the RONa compound to the resulting warfarin-isopropyl alcohol slurry or suspension, warming the resulting reaction mixture, e.g. to 50–80° C., cooling the reaction mixture, e.g. allowing the warm reaction mixture to cool to room temperature, and recovering the crystalline warfarin sodium·isopropyl alcohol complex after it crystallizes out of the cooled reaction mixture, e.g., by filtration. The sodium alkoxide or lower alcoholate is preferably added in solution form in an inert, anhydrous organic solvent which is miscible with the isopropyl alcohol. Illustrative examples are sodium methoxide dissolved in methanol; sodium ethoxide dissolved in absolute ethanol or ethanol denatured with methanol or isopropyl alcohol or benzene; sodium isopropoxide dissolved in isopropyl alcohol; sodium butoxide dissolved in butanol or a mixture of butanol and isopropyl alcohol, etc. The sodium hydroxide is also preferably added in solution form either in water or in organic solvents such as methanol or ethanol or in mixture of water and an alcohol as, for example, aqueous isopropyl alcohol. Where water is introduced into the warfarin-isopropyl alcohol slurry with the sodium hydroxide solution, a substantial amount of unreacted warfarin sodium, or the warfarin sodium-isopropyl alcohol complex, may remain in solution in the aqueous isopropyl alcohol reaction mixture, unless the ratio of water to isopropyl alcohol is relatively small, e.g. less than about 4 percent water. The water can be removed as for example by azeotropic distillation with benzene. Also, the ratio of water can be controlled so as to obtain good yields of the crystalline complex by concentrating the reaction mixture and diluting the resulting concentrate with isopropyl alcohol, or by diluting the reaction mixture as such with large volumes of isopropyl alcohol. Removal of water or dilution with isopropyl alcohol, however, is not necessary, where concentrated sodium hydroxide solutions are used and the sodium hydroxide solutions contain relatively little amounts of water compared to the amount of isopropyl alcohol present in the warfarin slurry. Also, a separate heating step is not required to induce formation and crystallization of the warfarin sodium·isopropyl alcohol complex, where the reaction mixture is heated to distill off the water or where the reaction mixture is concentrated by heating to form a concentrate. Seeding of the reaction mixture with crystalline warfarin sodium·isopropyl alcohol complex generally hastens crystallization of the crystalline complex and may be required in the initial runs.

The isopropyl alcohol used in the present invention in the warfarin slury should be of good grade, e.g. analytical reagent (A.R.) substantially anhydrous isopropyl alcohol, e.g. containing less than about 0.5% water. The isopropyl alcohol is also preferably used in sufficient amounts to form a free-flowing or thin warfarin slurry. A considerable amount of the warfarin is in solution in the warfarin-isopropyl alcohol mixture and all of it goes into solution after addition of the alkali (RONa).

The sodium alkoxide or sodium hydroxide is added in sufficient amounts to adjust the pH to about 9 to 10. As the presence of free alkali is known to increase the tendency of warfarin sodium to undergo degradation, pH adjustment to above pH 9.5 is not recommended. Also, to avoid the possibility of excess alkali, it is generally preferred to use equivalent amounts of alkoxide or hydroxide and warfarin plus about 1–5 grams of excess warfarin. The small amount of excess warfarin poses no problem as it remains in solution in the isopropyl alcohol with non-warfarin impurities when the warfarin sodium·isopropyl alcohol complex crystallizes out of the reaction mixture.

The reaction mixture after the addition of the alkoxide or hydroxide is generally clear and does not require filtration for clarification. However, if clarification is necessary due to the presence of undissolved material, no heat should be applied prior to filtration. The reason for this is that heating induces formation and crystallization of the warfarin sodium·isopropyl alcohol complex.

The complex recovered from the reaction mixture is preferably slurried in fresh A.R. isopropyl alcohol and refiltered. The unbound isopropyl alcohol can be removed by air drying at room temperature or under vacuum, or by a solvent wash with ethyl ether, methylene dichloride or a like low boiling solvent in which the isopropyl alcohol is soluble and the crystalline complex is insoluble. The yield is nearly quantitative as the warfarin sodium·isopropyl alcohol complex is substantially insoluble in isopropyl alcohol at room temperature.

The following examples will serve to illustrate the invention.

Example I

A warfarin-isopropyl alcohol slurry is first prepared by mixing about 200 ml. of A.R. isopropyl alcohol (containing less than .03% water) with 32 g. (0.1 mole + about 1.3 g. excess) of warfarin. A solution of sodium ethoxide containing some sodium isopropoxide is next prepared by reacting 2.3 g. (about 0.1 mole) of metallic sodium (freshly cut) with a mixture of 30 ml. of absolute ethanol and 60 ml. of A.R. isopropyl alcohol. After cooling the resulting alcohol solution of sodium alkoxide to about 20° C. it is added to the slurry of warfarin-isopropyl alcohol with rapid stirring.

The resulting solution is stirred rapidly and is heated to 75–80° C. to induce formation and crystallization of the warfarin sodium·isopropyl alcohol complex. The mixture is allowed to crystallize and cool to room temperature. Crystallization is complete in 3–4 hours and the crystalline complex is removed by filtration. The crystalline complex is then slurried with 100 ml. of A.R. isopropyl alcohol and refiltered. The unbound isopropyl alcohol is removed by a solvent wash with methylene dichloride.

Example II

Warfarin 313 g. (1 mole + about 5 g. excess) is first added to about 2 l. of A.R. isopropyl alcohol with mixing. A cool solution of 68 g. of sodium ethoxide (about 1 mole) in a mixture of about 300 ml. of absolute ethanol and 600 ml. of isopropyl alcohol is then added slowly to the warfarin-isopropyl alcohol slurry with rapid stirring. The resulting reaction mixture which contains both warfarin sodium and the excess warfarin in solution is then warmed to about 50–70° C. with rapid stirring and allowed to cool to room temperature (e.g. about 20–25° C.) with continued stirring. The warfarin sodium·isopropyl alcohol complex which crystallizes out of the reaction mixture is recovered by filtration, washed with fresh isopropyl alcohol, and air dried at room temperature or under vacuum of about 15 mm. to remove the unbound isopropyl alcohol.

*Example III*

This example is in accordance with Example I, except that the warfarin-isopropyl alcohol slurry is cooled to about 4° C. before addition of the solution of the sodium ethoxide. The solution of the sodium ethoxide can also be cooled. This is a preferred procedure as it insures that the reaction mixture remains cool until the reactants are thoroughly mixed.

*Example IV*

This example is in accordance with Example I, except that the 2.3 g. of metallic sodium is added to a mixture made up of 20 ml. of methanol and 50 ml. of isopropyl alcohol, and the resulting sodium methoxide solution containing some sodium isopropoxide is added to the warfarin isopropyl alcohol slurry.

*Example V*

This example is in accordance with Example IV, except that the metallic sodium is added to a mixture made up of n-propyl alcohol and isopropyl alcohol, and the resulting sodium n-propoxide solution containing some sodium isopropoxide is added to the warfarin slurry.

*Example VI*

This example is in accordance with Example IV, except that the sodium is added to a mixture of n-butyl alcohol and isopropyl alcohol, and the resulting solution containing sodium n-butoxide and sodium isopropoxide is added to the warfarin slurry.

*Example VII*

This example is in accordance with Example VI, except that the butyl alcohol is sec.-butyl alcohol, and the resulting solution containing sodium sec.-butoxide and sodium isopropoxide is added to the warfarin slurry.

*Example VIII*

This example is in accordance with Example VI, except that the butyl alcohol is isobutyl alcohol, and the resulting solution containing sodium isobutoxide and sodium isopropoxide is added to the warfarin slurry.

*Example IX*

This example is in accordance with Example VI, except that the butyl alcohol is t-butyl alcohol, and the resulting solution containing sodium t-butoxide and sodium isopropoxide is added to the warfarin slurry.

*Example X*

This example is in accordance with Example I, except that the sodium alkoxide is prepared by adding 2.3 g. of sodium to 50 ml. of methanol, and the resulting sodium methoxide solution is added to the warfarin slurry.

*Example XI*

This example is in accordance with Example X, except that the sodium is added to 50 ml. of n-propyl alcohol, and the resulting solution of sodium n-propoxide is added to the warfarin slurry.

*Example XII*

This example is in accordance with Example X, except that the sodium is adedd to 50 ml. of n-butyl alcohol, and the resulting solution of sodium n-butoxide is added to the warfarin slurry.

*Example XIII*

This example is in accordance with Example X, except that the sodium is added to 50 ml. of sec.-butyl alcohol, and the resulting solution of sodium sec.-butoxide is added to the warfarin slurry.

*Example XIV*

This example is in accordance with Example X, except that the sodium is added to 50 ml. of isobutyl alcohol, and the resulting solution of sodium isobutoxide is added to the warfarin slurry.

*Example XV*

This example is in accordance with Example X, except that the sodium is added to 50 ml. of t-butyl alcohol, and the resulting solution of sodium t-butoxide is added to the warfarin slurry.

*Example XVI*

This example is in accordance with Example II, except that a solution of sodium isopropoxide (82 g.) in isopropyl alcohol is used in place of the sodium ethoxide solution.

*Example XVII*

This example is in accordance with Example I, except that a solution of 4.0 g. of A.R. sodium hydroxide in 20 ml. of absolute methyl alcohol is used in place of the sodium ethoxide solution.

*Example XVIII*

This example is in accordance with Example I, except that a solution of 4.0 g. of A.R. sodium hydroxide in 40 ml. of absolute ethyl alcohol is used in place of the sodium ethoxide solution.

*Example XIX*

Warfarin 150 g. is suspended in 620 g. of A.R. isopropyl alcohol and the resulting warfarin-isopropyl alcohol slurry is neutralized to pH of about 9.2–9.3 with an aqueous sodium hydroxide solution containing 19.4 g. of sodium hydroxide dissolved in 60 ml. of water. The resulting reaction mixture containing warfarin sodium in solution is filtered to remove any insoluble material, the filter paper being washed with 200 cc. of isopropyl alcohol to insure that all soluble material is in the filtrate. Benzene, about 660 cc. is then added to the clear solution and the water removed by azeotropic distillation with the benzene. When the temperature of the distillate reaches about 79° C. the resulting warm solution is cooled to about 45° C., seeded with the crystalline warfarin sodium·isopropyl alcohol complex and the solution allowed to cool to room temperature. The warfarin sodium·isopropyl alcohol complex crystallizes out of solution, is recovered by filtration, washed with fresh isopropyl alcohol and air dried at about 50° C. or in vacuo at 50° C.

*Example XX*

Warfarin 1000 g. is suspended in 5 l. of isopropyl alcohol and neutralized to a pH of about 9.2–9.3 with an aqueous sodium hydroxide solution containing 137 g. of sodium hydroxide dissolved in 400 ml. of water. The reuslting solution is filtered and concentrated under vacuum (about 110 mm.) to a syrupy mass where the distillation has practically stopped and the temperature of the contents of the flask has reached about 55° C. A volume of warm isopropyl alcohol (5 l. at 50–55° C.) equal approximately to the volume of solvent removed during concentration (about 5 l.) is added with stirring to the warm mass. The resulting solution is allowed to cool to room temperature and the warfarin sodium·isopropyl alcohol complex that crystallizes out of solution is recovered by filtration and dried as above (Example XIX).

*Example XXI*

Warfarin 30 g. is suspended in 125 g. of isopropyl alcohol and neutralized to a pH of about 9.2–9.3 with aqueous sodium hydroxide solution (0.35 g. per ml. of water) as in Example XX. The solution is filtered to remove any insoluble impurities and then heated to about 50° C. The resulting solution is next diluted with 600 ml. of isopropyl alcohol, cooled and seeded with the crystalline warfarin sodium·isopropyl alcohol complex. The warfarin sodium·isopropyl alcohol complex that crystallizes out of solution is recovered by filtration. A second crop of the crystalline complex can be obtained by concentrating the mother liquor in accordance with Example XX.

*Example XXII*

Warfarin 15 g. is suspended in about 100 ml. of isopropyl alcohol, heated to reflux (about 82° C. and the warm suspension or slurry neutralized with 50% aqueous sodium hydroxide solution to pH of about 9.5 with water (3.8 ml.) containing 1.9 g. of sodium hydroxide. The resulting solution is cooled and seeded. The warfarin sodium·isopropyl alcohol complex that crystallizes out of solution is recovered as in the above examples.

The crystalline warfarin sodium·isopropyl alcohol complex can be used as such in a manner similar to warfarin sodium. Tests have shown the complex to have an extremely low Alkaline Color Value supra and to be free or substantially free from non-warfarin material responsible for color change and the formation of precipitates. If desired, however, the crystalline complex can be dissolved in water, filtered, concentrated and dried to obtain amorphous warfarin sodium in accordance with the concentrating and drying procedures described in Link U.S. Patent No. 2,777,859 mentioned above.

The isopropyl alcohol used in the present invention, as pointed out above, should be of good grade, with analytical reagent (AR) isopropyl alcohol being preferred for use in the substantially anhydrous reaction mixtures of Examples I–XVIII. However, commercial grade isopropyl alcohol specified, for example, to contain less than 1 percent of water can be used and, cost-wise, may be preferred where water is introduced into the reaction mixture as in Examples XIX–XXII.

It is claimed:

1. A process of preparing the crystalline warfarin sodium·isopropyl alcohol complex which comprises neutralizing warfarin in a warfarin-isopropyl alcohol slurry to a pH of about 9–10 with a compound represented by the formula RONa, where R is selected from the group consisting of hydrogen and lower alkyl groups containing 1–4 carbon atoms, warming the resulting reaction mixture to about 50–80° C., cooling the warm reaction mixture and recovering the resulting crystalline warfarin sodium isopropyl alcohol complex from the tool reaction mixture.

2. The process of claim 1, where the warfarin is neutralized with a sodium alkoxide in solution form in an inert, anhydrous organic solvent which is miscible with isopropyl alcohol.

3. The process of claim 2, where the warfarin is neutralized with an ethanol-isopropyl alcohol solution of sodium ethoxide.

4. The process of claim 1, where the warfarin is neutralized with sodium hydroxide in solution form in an anhydrous solvent selected from the group consisting of methanol and ethanol.

5. The process of claim 1, where the isopropyl alcohol slurry contains an excess of warfarin and the reaction contains about 1–5 grams of free warfarin.

6. The process of claim 1, where the warfarin-isopropyl alcohol slurry is cooled before neutralizing the warfarin to form the warfarin sodium.

7. The process of claim 1, where the warfarin is neutralized with aqueous sodium hydroxide and the cool reaction mixture in which the warfarin sodium·isopropyl alcohol complex is crystallizing contains less than about 4% water.

8. The process of claim 7 where the water is removed from the reaction mixture by azeotropic distillation.

9. The process of claim 7 where the reaction mixture is concentrated and the resulting concentrate is diluted with isopropyl alcohol.

10. The process of claim 7 where the reaction mixture is diluted with isopropyl alcohol.

11. The process of claim 7 where the warfarin-isopropyl alcohol slurry is heated to reflux and the warm slurry is neutralized with concentrated aqueous sodium hydroxide.

References Cited by the Examiner

UNITED STATES PATENTS 2,777,859    1/1957    Link _____ 260—343.2
3,077,481    2/1963    Schroeder et al. ____ 260—343.2

WALTER A. MODANCE, *Primary Examiner.*

NICHOLAS S. RIZZO, *Examiner.*